United States Patent [19]

Fetsch

[11] Patent Number: 4,674,720
[45] Date of Patent: Jun. 23, 1987

[54] PIPE SADDLE

[75] Inventor: Rudolf Fetsch, St. Ingbert, Fed. Rep. of Germany

[73] Assignee: UNIMA Maschinenbau GmbH, Sulzbach-Neuweiler, Fed. Rep. of Germany

[21] Appl. No.: 844,204

[22] Filed: Mar. 26, 1986

[30] Foreign Application Priority Data

Mar. 28, 1985 [DE] Fed. Rep. of Germany ....... 3511261

[51] Int. Cl.⁴ ............................................. F16L 3/08
[52] U.S. Cl. ................................ 248/74.1; 24/20 EE; 24/23 EE
[58] Field of Search ...................... 248/62, 74.1, 74.3, 248/231, 499, 505; 24/20 R, 20 EE, 23 EE, 20 CW, 22, 21, 270, 23 W; 403/375, 393, 344

[56] References Cited

U.S. PATENT DOCUMENTS

| Re: 22,846 | 2/1947 | Morehouse | 248/74.3 |
|---|---|---|---|
| 192,978 | 7/1877 | Degray | 24/23 EE |
| 1,934,995 | 11/1933 | Owen | 24/23 EE |
| 2,382,945 | 8/1945 | Trafton | 24/20 EE X |
| 3,235,925 | 2/1966 | Gerhardt et al. | 24/23 EE |
| 3,330,517 | 7/1967 | Zimmermann | 248/62 |
| 4,222,155 | 9/1980 | Oetiker | 24/20 EE X |

FOREIGN PATENT DOCUMENTS 1883763 11/1963 Fed. Rep. of Germany.
2911897 9/1982 Fed. Rep. of Germany.

*Primary Examiner*—J. Franklin Foss
*Attorney, Agent, or Firm*—Roylance, Abrams, Berdo & Goodman

[57] ABSTRACT

A pipe saddle has a detent closure including a detent in the vicinity of one end of a saddle body and a detent support in the vicinity of the other end of the saddle body cooperating with the detent when in a closed position. The detent support is located in the vicinity of a passage receiving the detent. The detent is located in an edge portion cut out of the end of the saddle body and curved inward. To provide a detent facing radially inward at least in the fastened state of the pipe saddle, a detent recess is provided separate from the passage. The recess has an edge on which the detent can be supported. The detent recess is arranged in the vicinity of the part of the saddle body lying on the periphery of the pipe saddle.

10 Claims, 4 Drawing Figures

PIPE SADDLE

FIELD OF THE INVENTION

The present invention relates to a pipe saddle having a detent closure for securing a pipe saddle body in a closed position.

BACKGROUND OF THE INVENTION

In a known pipe saddle, the detent is located on a cylindrical wall part curved outwardly in its middle. A special deformation process is required for manufacturing this wall part. The detent of the known pipe saddle projects radially. A special safety or holder in the form of an outwardly curved opposite end of the pipe saddle must be provided for protection of the operators.

Thus, the known pipe saddle is disadvantageously complex and expensive to manufacture and operate.

SUMMARY OF THE INVENTION

An object of the present invention is to provide a pipe saddle with a detent closure wherein the detent member projects radially inwardly when closed.

Another object of the present invention is to provide a pipe saddle with a detent closure which is simple and inexpensive to manufacture and operate, and is of rugged contruction.

The foregoing objects are basically obtained by a pipe saddle with a detent closure, comprising a saddle body, a radially projecting detent member adjacent a first end on the saddle body periphery, a detent recess on the saddle body periphery adjacent a second end for receiving and engaging the detent member to lock the pipe saddle in a closed position, and a detent support formed as an outwardly bent steel strip extending from one of the ends. The strip has a cavity therein separate from the detent recess for receiving the other end of the saddle body.

By forming the saddle pipe in the manner, the detent member can project inwardly and still engage the detent recess to close the pipe saddle. The detent member can project in a direction away from a free edge of the saddle body permitting the detent member to engage the detent recess easily during the closing operation.

Release of the detent member can be impeded by the cavity having a dimension corresponding approximately to a maximum radial spacing of sections of the detent member and the wall part facing the detent member and cavity.

The bent strip can have a curved part including the cavity and an inwardly extending part to provide a space saving structure about the detent closure.

The curved part of the detent support can extend over the detent recess, be flexible and be laterally spaced from the laterally adjacent portion of the saddle body by a distance less than the thickness of the saddle body. This arrangement will hold the detent member in a closed position.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings which form a part of this disclosure.

DETAILED DESCRIPTION OF PREFERRED EMBODIMENTS

Figure 1:
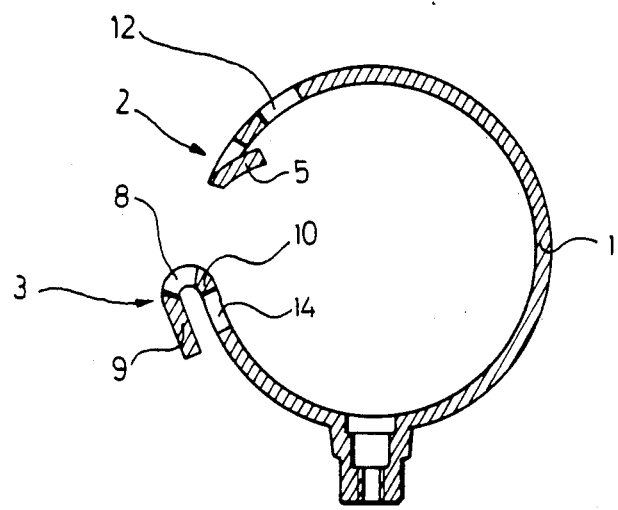
FIG. 1 is a side elevational view in section of a pipe saddle in an open position according to a first embodiment of the present invention.
Figure 2:
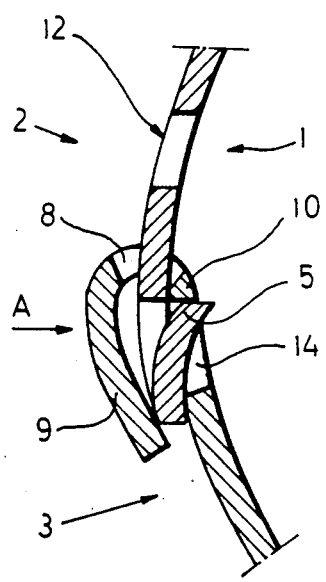
FIG. 2 is an enlarged partial side elevational view in section of the pipe of FIG. 1 in a closed position.
Figure 3:
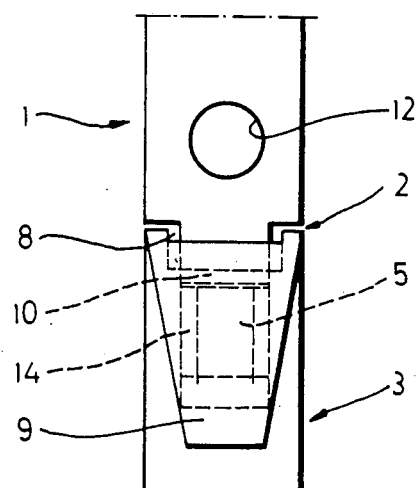
FIG. 3 is an enlarged partial front elevational view of the pipe saddle of FIG. 1.

The pipe saddle has a saddle body 1 which is essentially circular and has ends 2 and 3. End 2 is configured narrower than saddle body 1, and has a detent member 5. The detent member is constructed as an inwardly projecting fin so that there is a connection between the outermost or free edge portion of this end and the fin. The detent member is narrower than end 2.

End 3 is curved outwardly and has a passage or cavity 8 in its curved part. The length of passage 8 along end 3 of saddle body 1 corresponds approximately to the radial distance between the sections of detent member 5 most distant from each other and the wall part of saddle body 1 facing these sections. A detent recess 14 is formed in end 3 in the vicinity of the part of saddle body 1 lying on the periphery of the pipe saddle. Between passage 8 and detent recess 14, a crosspiece 10 is located serving as support for detent member 5.

An end portion 9 of end 3 extends generally parallel to the saddle body and overlaps detent recess 14. The space between end portion 9 and the adjacent part of saddle body 1 is somewhat smaller than the largest space between the inside part of detent member 5 and the laterally adjacent outside part of saddle body 1. A recess 12, configured as a passageway, is provided in the area of end 2 in the vicinity of detent member 5.

A device for the fastening the pipe saddle to a stationary body is located on saddle body 1. In the exemplary embodiment, this device is a bushing-like part which is outwardly deformed and has internal threads. The part is arranged at an angle of approximately 90° about the pipe saddle relative to end 3.

When a pipe is placed in the saddle body, end 2 is inserted through passage 8, and the front or free edge of end 2 is guided onto end portion 9, until detent member 5 fits in detent recess 14 and is supported on crosspiece 10 at the front. With introduction of detent member 5 into passage 8, end portion 9 is bent elastically outwardly. The intermediate space between this end portion 9 and the adjacent part of saddle body 1 is so large that when saddle body 1 is closed, end portion 9 is flexibly biased and tends to hold detent member 5 on crosspiece 10. A tool can be used for the connection of ends 2 and 3, which tool fits in recess 12 on the one hand and is supported on the front or free edge of end portion 9.

To release the detent device, end portion 9 is pressed elastically outwardly, and detent member 5, with use of a tool, is likewise removed in radial direction from crosspiece 10. In this manner, end 2 can be removed from passage 8.

Figure 4:
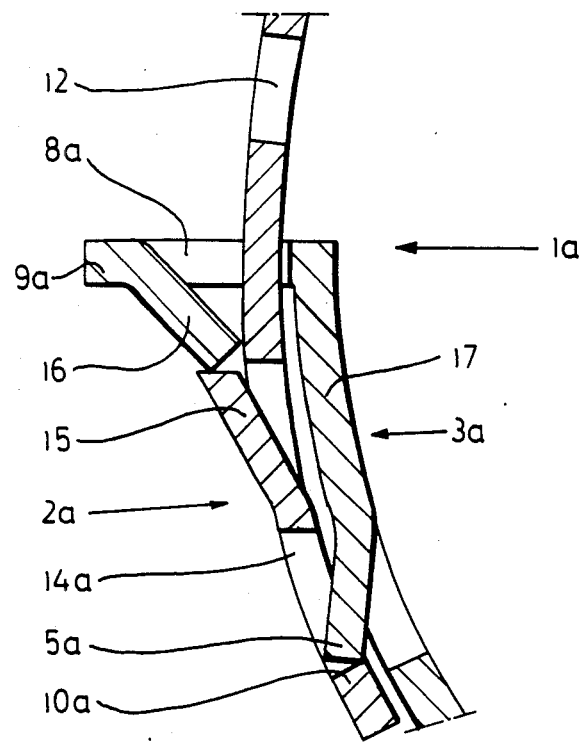
FIG. 4 is an enlarged partial side elevational view in section of a pipe saddle in a closed position according to a second embodiment of the present invention.

In the second exemplary embodiment of FIG. 4, the same parts as in the first exemplary embodiment are provided with the same reference number, with the letter a is added to the number of the modified parts.

Detent member 5a is formed in the vicinity of end 3a of saddle body 1a having passage 8a. Passage 8a is formed with a radially outward projection 9a. Detent member 5a is in the area of part of the saddle body lying on the periphery of the pipe saddle. Detent recess 14a is provided in the end 2a and its outside edge serves as detent support 10a.

Behind detent recess 14a on end 2a in a direction toward saddle body 1a, an outwardly curved support fin 15 is provided. A holding fin 16 with a free support edge mates with fin 15 and is adjacent to saddle body 1a when the saddle body is closed. Fin 16 projects from one end of passage 8a to a engage fin 15 curved out of end 2a, and is directed to support fin 15. Holding fin 16, seen in FIG. 4, projects toward support fin 15, limits passage 8a and allows this to be at least partially free. Holding fin 16 secures the control of end 2a in the area of end 3a having detent member 5a. In the same manner as the detent member 5a, while resting on support fin 15, holding fin 16 prevents removal of end 2a from passage 8a.

For removal of end 2a from passage 8a, especially with the aid of a tool, both detent member 5a and support fin 15 are pressed toward the middle of saddle body 1a. With insertion of end 2a in the passage 8a, fins 15 and 16 and detent member 5a flex elastically radially.

End 2a, as seen in FIG. 4, can have a portion provided over passage 8a for support on the inside edge of the passage. Support fin 15 can be deleted if detent member 5a is arranged adjacent to passage 8a with a quite short crosspiece 17. Holding fin 16 then lies in the area of detent recess 14a on end 3a.

The detent device 5a and 10a of the second exemplary embodiment can be used in the first exemplary embodiment, and vice versa.

While various embodiments have been chosen to illustrate the invention, it will be understood by those skilled in the art that various changes and modifications can be made therein without departing from the scope of the invention as defined in the appended claims.

What is claimed:

1. A pipe saddle with a detent closure, comprising:
   a saddle body having first and second ends and a periphery;
   a radially projecting detect member adjacent said first end on the saddle body periphery;
   a detent recess on the saddle body periphery adjacent said second end for receiving and engaging said detent member to lock the pipe saddle in a closed position, said detent recess having a passageway defined by a wall part; and
   a detent support formed as an outwardly bent steel strip extending from one of said ends, said strip having a cavity therein separate from said detent recess for receiving the other end of said saddle body, said wall part being adjacent said cavity and engaging said detent member, said cavity having a dimension in said strip corresponding approximately to a maximum radial spacing of sections of said detent member and said wall part facing said detent member and said cavity.

2. A pipe saddle according to claim 1 wherein said detent support is on said first end.

3. A pipe saddle with a detent closure, comprising:
   a saddle body having first and second ends and a periphery;
   a radially projecting detent member adjacent said first end on the saddle body periphery;
   a detent recess on the saddle body periphery adjacent said second end for receiving and engaging said detent member to lock the pipe saddle in a closed position; and
   a detent support formed as an outwardly bent steel strip extending from one of said ends, said strip having a cavity therein separate from said detent recess for receiving the other end of said saddle body, said bent strip including a curved part in which said cavity is located and an inwardly extending part extending from said curved part toward said saddle body.

4. A pipe saddle according to claim 3 wherein said detent recess comprises a passageway defined by a wall part adjacent said cavity, said wall part engaging said detent member.

5. A pipe saddle according to claim 4 wherein said cavity has a dimension in said strip corresponding approximately to a maximum radial spacing of sections of said detent member and said wall part facing said detent member and said cavity.

6. A pipe saddle according to claim 3 wherein said curved part extends over said detent recess, is elastically flexible and is laterally spaced from a laterally adjacent portion of said saddle body by a distance less than a thickness of said saddle body.

7. A pipe saddle with a detent closure, comprising:
   a saddle body having first an second ends and a periphery;
   a radially projecting detent member adjacent said first end on the saddle body periphery;
   a detent recess on the saddle body periphery adjacent said second end for receiving and engaging said detent member to lock the pipe saddle in a closed position;
   a detent support formed as an outwardly bent steel strip extending from one of said ends, said strip having a cavity therein separate from said detent recess for receiving the other end of said saddle body; and
   a holding fin extending from an edge of said cavity, said holding fin being adjustable in an area of the saddle body end remote from said cavity.

8. A pipe saddle according to claim 7 wherein one of said ends of said saddle body comprises a support fin bent out therefrom and cooperating with said holding fin.

9. A pipe saddle according to claim 7 wherein said detent support is on said second end.

10. A pipe saddle according to claim 7 wherein said detent support is on said first end.

* * * * *